United States Patent [19]

Hyppanen

[11] Patent Number: 5,425,412
[45] Date of Patent: Jun. 20, 1995

[54] METHOD AND APPARATUS FOR OPERATING A CIRCULATING FLUIDIZED BED REACTOR SYSTEM

[75] Inventor: Timo Hyppanen, Karhula, Finland

[73] Assignee: A. Alhstrom Corporation, Noormarkku, Finland

[21] Appl. No.: 124,767

[22] Filed: Sep. 22, 1993

Related U.S. Application Data

[63] Continuation-in-part of Ser. No. 973,396, Nov. 10, 1992, Pat. No. 5,341,766.

[51] Int. Cl.⁶ .............................................. F28D 15/00
[52] U.S. Cl. .................................. 165/1; 165/104.16; 165/104.18
[58] Field of Search ...................... 165/104.18, 104.16, 165/1; 128/40

[56] References Cited

U.S. PATENT DOCUMENTS

| | | | |
|---|---|---|---|
| 4,538,549 | 9/1985 | Stromberg . | |
| 4,552,203 | 11/1985 | Chrysostome et al. | 122/4 D |
| 4,672,918 | 6/1987 | Engstrom et al. | 110/245 |
| 4,688,521 | 8/1987 | Korenberg . | |
| 4,716,856 | 1/1988 | Beisswenger et al. | 122/4 D |
| 4,896,717 | 1/1990 | Campbell, Jr. et al. | 122/4 D |
| 4,915,061 | 4/1990 | Garcia-Mallol . | |
| 4,951,612 | 8/1990 | Gorzegno . | |
| 5,014,652 | 5/1991 | Hyldgaard | 122/4 D |
| 5,025,755 | 6/1991 | Eickvonder et al. . | |
| 5,040,492 | 8/1991 | Dietz | 122/4 D |
| 5,054,436 | 10/1991 | Dietz | 122/4 D |
| 5,060,599 | 10/1991 | Chambert | 122/4 D |
| 5,069,170 | 12/1991 | Gorzegno et al. | 110/245 |
| 5,069,171 | 12/1991 | Hansen et al. | 122/4 D |
| 5,133,943 | 7/1992 | Abdulally | 122/4 D |
| 5,141,708 | 8/1992 | Campbell, Jr. et al. | 122/4 D |

FOREIGN PATENT DOCUMENTS

WO/9005020  5/1990  WIPO .

*Primary Examiner*—A. Michael Chambers
*Attorney, Agent, or Firm*—Nixon & Vanderhye

[57] ABSTRACT

A circulating fluidized bed (CFB) system and method of operation provide for improved heat recovery. One or more return ducts from a particle separator attached to the combustion chamber have a heat transfer section with heat transfer surfaces. Low velocity fluidizing gas is introduced into a bed of particles having distinct heat transfer and particle transport sections to fluidize the bed, and transporting gas is separately introduced to transport a desired rate of particles from the bed to the combustion chamber through a solid particle inlet which is below the top surface of the bed of particles. Barriers are established which prevent the transporting gas from interfering with heat transfer in the heat transfer section.

25 Claims, 3 Drawing Sheets

METHOD AND APPARATUS FOR OPERATING A CIRCULATING FLUIDIZED BED REACTOR SYSTEM

CROSS-REFERENCE TO RELATED APPLICATION

This application is a continuation in part of application Ser. No. 07/973,396 filed Nov. 10, 1992, now U.S. Pat. No. 5,341,766, issued Aug. 30, 1994.

BACKGROUND AND SUMMARY OF THE INVENTION

This invention relates to a novel method and an apparatus for operating a circulating fluidized bed system.

Circulating fluidized bed (CFB) systems, such as CFB combustors include a combustion chamber having a fast fluidized bed of particles therein. A particle separator connected to a discharge opening in the upper part of the combustion chamber, for separating solid particles from the suspension of flue gases and entrained solid material being discharged from the combustion chamber. One or several return ducts are connected between the particle separator and the lower part of the combustion chamber, for recirculating separated solid particles from the particle separator into the combustion chamber. A gas outlet is arranged in the particle separator for discharging flue gases.

Cyclone separators are commonly used as particle separators. A dip leg type return pipe recirculates the separated particles from the cyclone to the lower part of the combustion chamber. A loop seal is arranged in the return pipe in order to prevent gases from flowing from the combustion chamber backward into the cyclone therethrough.

The circulating fluidized bed reactors are used in a variety of different combustion processes. Depending on the process, different bed materials are fluidized and circulated in the system. In combustion processes particulate fuel such as coal, coke, lignite, wood, waste or peat, as well as other particulate matter such as sand, ash, sulfur absorbent, catalyst or metal oxides can be the constituents of the fluidized bed. The velocity in the combustion chamber usually is in the range of 3.5 to 10 m/s, but can be substantially higher.

Typically heat is recovered from fluidized bed combustion processes by heat transfer surfaces in the combustion chamber and in the convection section disposed in the gas path after the particle separator. The peripheral walls of the combustion chambers are usually made as membrane walls in which vertical tubes are combined by fins to form evaporating surfaces.

Additional heat transfer surfaces such as superheaters may have to be disposed within the upper part of the combustion chamber for e.g. superheating the steam.

Corrosion and erosion may thereby constitute problems in the high temperature and high flow velocity surroundings in the combustion chamber. Heat transfer surfaces have to be made of heat resistant material often protected by some erosion resistant material or some special constructions have to be utilized. Such heat transfer surfaces are very heavy and expensive, heat resistant material being expensive. Corrosion affects heat transfer surfaces in the gas space of a combustion chamber especially at steam/water temperatures over 400° to 500° C., when burning fuels containing gaseous chlorine and alkali components.

It may also be difficult to achieve desired superheating of steam at low load conditions. The combustion chamber exit gas temperature decreases with decreasing load and the superheaters in the convection section do not have enough capacity to provide the desired results. Additional superheaters arranged within the combustion chamber increase costs and control problems in the boiler.

There has been a further need to find new ways to add heat transfer surfaces into the system without having to increase the size of the combustion chamber, especially in pressurized applications. In pressurized applications it is even less desirable to have to add the heat transfer surfaces into the combustion chamber and thereby increase the size of the combustor, as it would lead to an increased size of the pressure vessel and huge rise in costs.

It has been suggested to use external heat exchangers (EHE) for increasing the superheating capacity. In EHE superheaters are arranged in a separate fluidized bed reactor with hot circulating solid material, which is introduced into the EHE from the particle separator. The suggested external heat exchangers would be large and expensive, heavy if constructed by uncooled structures, as well as, difficult to control. A more simple and less expensive solution is needed.

It has also been suggested (see U.S. Pat. No. 4,716,856) to include heat transfer surfaces in the recycling system of a circulating fluidized bed reactor. The heat transfer surfaces would be disposed in a fluidized bed of solid circulating material collected in a heat exchanger chamber formed in the bottom part of the return duct. Thus the circulating solid material would provide the additional heat needed for e.g. superheating without a need to arrange separate external heat exchangers. A loop seal in the return duct provides the gas seal needed between the combustion chamber and the particle separator. The solid material would be reintroduced from the return duct into the combustion chamber by overflow.

Control of heat transfer in the recycling system has however not been satisfactorily solved yet. It has been suggested to use the fluidizing gas to control the heat transfer. The fluidizing gas is however also used for reintroducing solid material by overflowing from the recycling system into the combustion chamber. It would therefore not be possible to independently control heat transfer or solid material circulation by fluidizing gas at different loads.

Reintroducing the solid material into the combustion chamber by overflow as suggested would keep a constant bed level in the heat exchanger chamber and prevent variations in bed height, which is a clear limitation of the system. It is desirable in many applications to be able to control the height of the bed in order to be able to control the gas sealing effect of the bed and the heat transfer in the bed.

Further due to the overflow a less efficient mixing of solid material and hence less efficient heat transfer is achieved in the heat exchanger chamber. Solid material introduced onto the surface of the bed is only partly mixed into the bed. Material not mixed into the bed is immediately discharged through the overflow opening, without heat transfer to the bed or heat transfer surfaces.

Still further, due to the overflow, large and heavy particles tend to more easily fall into the bed and less efficiently circulate in the bed; that is they tend to accumulate on the bottom of the heat exchanger chamber without being reintroduced into the combustion chamber. The large particles may cause problems in heat transfer, fluidization, and solid flow in the return duct, as well as cause erosion.

SUMMARY OF THE INVENTION

It is an object of the present invention to provide a method and an apparatus for operating circulating fluidized bed systems in which the above mentioned drawbacks are minimized.

It is also an object of the present invention to provide an improved method for heat recovery in circulating fluidized bed systems.

It is further an object of the present invention to provide an improved method for controlling heat recovery in a circulating fluidized bed system.

It is still further an object of the present invention to provide an improved method and apparatus for improving solid mixing and heat transfer in a heat transfer section in a return duct, as well as, minimizing problems with big particles accumulating in the return duct.

This is achieved by the method and circulating fluidized bed reactor system according to the appended claims.

According to the present invention there is provided a method of operating a CFB system comprising the steps of (a) establishing a fast fluidized bed of solid particles in the combustion chamber so that a particle suspension comprising flue gases and solid particles entrained therein is caused to flow upwardly in the combustion chamber, (b) collecting solid particles separated from the gas and particle suspension, (c) directing collected solid particles into a return duct, (d) establishing a bed of solid particles in the lower part of the return duct, the bed of solid particles having separately a heat transfer section and a particle transport section, (e) recovering heat from the bed of solid particles in the heat transfer section with heat transfer surfaces disposed therein, (f) introducing fluidizing gas into the bed of solid particles in the heat transfer section through fluidizing gas inlets, for enabling heat transfer, (g) introducing separately from the fluidizing gas transporting gas into the bed of solid particles in the particle transport section through transporting gas inlets, and (h) transporting solid particles with the transporting gas through at least one solid particle inlet into the combustion chamber, the solid particle inlet being arranged at a level below the surface level of the bed of solid particles.

The heat transfer section and the particle transporting section may thus according to a preferred embodiment of the invention be formed in the lower part of the return duct in a solid bed chamber in one and the same bed of solid particles, wherein the particles are free to flow from one section to the other, the main particle stream flow being however from bed surface via heat exchanger section to the particle transport section and solid particles inlet.

There is according to a preferred embodiment of the present invention a barrier bed portion of only slightly or non-fluidized particles established within the bed of solid particles, formed between the fluidizing gas inlets and the transporting gas inlets, e.g. in the region between the heat transfer section and the particle transporting section, for preventing transporting gas from interfering with heat transfer and fluidizing gas from interfering with reintroduction of particles into the combustion chamber.

According to a further preferred embodiment of the present invention the bottom of the heat transfer section is disposed at a higher level than the bottom of the particle transport section. Fluidizing gas is then introduced into the solid bed of particles at a higher level than transporting gas.

The particles in the return duct are preferably directly recycled into the combustion chamber, but can be if needed recycled into an intermediate chamber which has further connection with the combustion chamber.

The bed in the lower part of the return duct is formed of solid particles circulating in the CFB system, these particles having a smaller particle size distribution than the mean size distribution of the total mass of particles in the whole reactor system. The small size of the particles being advantageous for heat transfer in the return duct.

The heat transfer from particles to heat transfer transfer section is according to a preferable embodiment of the invention controlled by introducing a fluidizing gas flow into at least a part of the heat transfer section. An increased gas flow and increased movement of particles around the heat transfer surfaces provides an increased heat transfer. Gas, such as air or inert gas for heat transfer control may be introduced through several separate nozzles.

According to another preferred embodiment of the invention the heat transfer in the heat transfer section may be controlled by controlling the flow of transporting gas introduced into the particle transporting section. According to this embodiment the bed surface level may be held at a constant level by having a portion of the solid particles directly transported by overflow into the combustion chamber. Only a controlled portion of the particles is allowed to flow through the bed and the heat transfer section, which portion is controlled by controlling the transporting gas flow discharging solid particles through the solid particle inlet(s) below the bed surface level.

By decreasing the amount of solid material being transported through the solid particle inlet(s) and correspondingly increasing the overflow of particles into the combustion chamber an increased amount of particles only reaches the surface of the bed of solid particles before being reintroduced into the combustion chamber. A decreased amount of solid particles flows through the heat transfer section. The temperature in the bed decreases, as well as, heat transfer due to decreased temperature difference between particles and heat transfer surfaces.

By increasing the amount of solid material being transported through the solid particle inlet(s) an increased amount of fresh hot solid material may continuously be transported through the bed and heat transfer section increasing the temperature and heat transfer in the bed.

In the bottom of the return duct the bed moves slowly downward as solid material is reintroduced into the combustion chamber and new material is continuously added on top of the bed. The height of the bed may according to a preferred embodiment of the invention be controlled by controlling the transporting gas reintroducing solid material into the combustion chamber. The height of the bed may then in some cases be used to control the heat transfer.

The bed of solid particles in the return duct constitutes a gas seal for preventing combustion gases from flowing backwards from the combustion chamber through the solid particle inlet(s) into the return duct. The gas seal effect may be controlled by controlling the transporting gas i.e. independently from the fluidizing gas controlling heat transfer.

Solid material is according to a preferred embodiment of the invention reintroduced into the combustion chamber through one or several vertically narrow, narrow horizontally elongated slot like passages, e.g. one or several L-valves, on top of each other, forming the solid particle inlets. The narrow slot like passages between the return duct and the combustion chamber are filled with a mass of solid particles, which due to the construction of the passages is not able to flow by itself therethrough. The passages thereby constitute solid flow gas seals controlling the flow of particles from the return duct into the combustion chamber. The flow through the passages may thereby also control the total height of the bed in the return duct and the gas sealing effect of the bed between the combustion chamber and the particle separator.

The flow through the passages is controlled by controlling the flow of transporting gas in the vicinity of the passages. The transporting gas imparts motion to the particles in and around the slot like passages, transporting particles through the passages into the combustion chamber.

The solid flow gas seal effect of a passage depends on the ratio (h/l) between the vertical extension (h) of the passage and the length (l) of the passage. The ratio (h/l) should according to one preferred embodiment of the invention for horizontal passages be smaller than 0.5 in order to prevent solids from flowing uncontrollably by themselves through the passages. The smaller the vertical extension (h) of the passages the shorter can be the length (l) of the passage. For example, in some applications a passage having a height of about 100 mm and length of about 200 mm, disposed in a 200 mm thick wall would suffice to establish a solid flow seal able to control solid flow in the return duct and solid bed chamber.

The cross sections of the passages taken in the plane of the wall are preferably rectangular and slot like, but passages having square or round cross sections may be preferable in some applications.

The passages can be made inclined having outlet ends in the combustion chamber on a higher level than inlet ends in the return duct, this incline preventing coarse material from accumulating at the inlet end of the passages. In inclined passages, the length (l) of the passage can be further decreased compared to horizontal passages having the same cross section.

The total vertical extension $h_{tot}$ needed for an imaginary single large passage can according to one important aspect of the invention thereby be divided into several vertical extensions $h_1$, $h_2$, $h_3$, ... , each divided vertical extension being just a fraction of the total needed. The length (l) of each passage can then be decreased in the same proportion as the vertical extension is decreased, without the sealing effect of the solid flow being decreased.

According to a preferred embodiment of the invention short passages, only long enough to extend through a common usually refractory lined membrane wall, between the particle transport section and combustion chamber, can be used for transporting particles from the return duct into the combustion chamber, while still providing an adequate solid flow seal. The passages have approximately a length (l)=the total width (w) of the common wall between the particle transport chamber and combustion chamber, the width of the wall including tubes and refractory lining. This is a considerable improvement over prior art L-valve seals, reaching far out from the combustion chamber and being very space consuming. The present invention provides a very compact solution in which the solid flow seal can be integrated into the wall construction.

The solid flow passages may easily be formed in the fins combining the tubes in a membrane tube wall. In most cases the passages may be formed in a wall section where tubes have been bent further apart from each other and where the tubes are combined by broad fins, broad enough to provide the space needed for the passages. The passages may be arranged on top of each other, forming e.g. an Ahlstrom "gill seal" solid flow seal connection, and combined in prefabricated frames.

The present invention provides an improved method for controlling solid flow from the return duct into the combustion chamber. The transporting gas for transporting solids through the solid particle inlet(s) may be introduced through gas inlets, nozzles or openings, in the bottom of the return duct and/or through gas inlets in a wall in the vicinity of the solid particle inlets. By controlling the amount of transporting gas through different gas inlets and possibly at different levels or locations it is possible to control the amount of solids flowing through the solid particle inlets. Transporting gas introduced through gas inlets in the bottom of the return duct may reintroduce solid particles through all solid particle inlets, whereas transporting gas introduced through gas inlets higher up, on a side wall, mainly reintroduces solid particles through inlets higher up in the return duct.

Air from the fluidized bed reactor windbox or air from a separate blower, preferably at a slightly higher pressure, or some other cheap gas, e.g. recycled flue gas, may be used as transporting gas. Other inert gases could also be used especially if inert, non-oxidizing conditions are needed.

Transporting gas is according to a preferred embodiment of the invention introduced into the bed of solid particles in the return duct at a location or locations from which it flows mainly towards the solid particle inlet(s) and not to the heat transfer zones in the return duct.

Preferably a portion of the solid particle bed portion in the particle transporting section constitutes the barrier bed preventing gas from flowing from the heat transfer section into the transporting section or vice versa.

A barrier bed portion of solid particles maintained mainly between the transporting gas inlets and the heat transfer section, i.e. a barrier bed in the transporting section, prevents transporting gas from interfering with the heat transfer. Whereas a barrier bed portion of solid particles maintained in the heat transfer section prevents fluidizing gas from interfering with the transport of solid particles through the bed. In most cases both above mentioned goals may be achieved with one and the same barrier bed portion.

The present invention may be applied in fluidized bed reactor systems having a solid bed chamber in the return duct with an inclined bottom, the lowermost part of the bottom being connected to the combustion chamber. A heat transfer section is then formed above the upper portion of the inclined bottom. A particle transporting section, for reintroducing solid material into the combustion chamber, is formed on the lower portion of the inclined bottom. A partition wall may be disposed on the inclined bottom between the heat transfer and particle transporting sections. Fluidizing gas is introduced through the upper inclined bottom portion into the heat transfer section. Transporting gas is introduced through the lower portion of the inclined bottom into the particle transporting section. A barrier bed of e.g. only slightly fluidized particles is maintained preferably on the lower portion of the inclined bottom, for forming a barrier bed preventing transporting gas from interfering with the heat transfer and preventing the fluidizing gas from interfering with the transporting of solid particles through the at least one solid particle inlet.

The present invention may be applied in reactor systems having return ducts with horizontal bottoms also, as long as care is taken that a barrier bed is allowed to be formed on a portion of the bottom, for preventing transporting gas or fluidizing gas from interfering with each other.

The particle transporting section may be formed below the heat transfer section in a downward directed duct or channel portion connected to the combustion chamber, through vertically narrow passages forming solid flow seals.

The present invention provides the advantage of providing a method for independently controlling the fluidizing gas flow and the transporting gas flow in the return duct, and thereby independently controlling heat transfer effect and gas seal effect in the return duct.

Heat transfer effect may be controlled by location and/or flow rate of fluidizing gas flow in the heat transfer zone while bed height or particle flow through bed is controlled by the transporting gas flow. It may also to some extent be possible to control the heat transfer by controlling the total height of the bed, especially if a part of the heat transfer surfaces extend above the bed.

A further important advantage is the improvement in mixing of particles and improvement in heat transfer achieved by being able to transport particles mainly through the whole bed in the return duct and not immediately discharging a portion of the particles by overflow.

A further advantage is achieved as only very small amounts of transporting gas compared to the amount of fluidizing gas in the heat transfer section is needed for transporting solid particles through the vertically narrow inlets into the combustion chamber.

Also relatively small fluidizing gas velocities of 0, or just above 0, to 1 m/s are all that are necessary to provide a suitable heat transfer. The fluidizing gas needed primarily may be discharged from the return duct into the combustion chamber through openings arranged above the bed. A gas seal is often needed in the uppermost part of the return duct for preventing the fluidizing gas from flowing into the particle separator. In some cases the gas flow needed to control the heat transfer may even be so small that it may be allowed to flow up into the separator.

The gas space in the heat transfer zone containing primarily clean fluidizing gas without alkaline, chlorine or other corrosive gaseous components, provides very advantageous conditions for superheating. The superheaters may here be heated to much higher temperatures than what normally is the case in corrosive conditions prevailing in the combustion chamber itself. According to the invention, steam of $>500°$ C., even $>550°$ C., may also be produced also when burning corrosive gaseous components containing fuels.

It has especially been a problem in waste/RDF burning boilers to utilize the heat for superheating, due to the unclean exhaust gases, containing different kinds of corrosion causing components. The present invention provides a system in which the superheater surfaces contact hot circulating material in a safe gas atmosphere.

Also erosion is minimized in the slowly bubbling bed having gas velocities of $<1$ m/s, e.g. 40 cm/s, whereby particles colliding with the heat transfer surfaces have a very low impact velocity. Additionally erosion in the present return duct bed is relatively low due to the small particle size of bed material.

When dividing the bed in the solid bed chamber into a heat transfer section and a particle transporting section by an inclined bottom or a separate lower outlet channel portion in the return duct, large particles, e.g. ash particles, agglomerates formed in the bed, or refractory material broken loose from the return duct walls, fall by gravity downward in the return duct below the fluidizing gas inlet level and away from the heat transfer zone, where they could cause mechanical damage and other problems, such as decrease in heat transfer.

The present invention provides a very simple CFB boiler construction. The entire recycling system including the separator and return duct may be primarily constructed of two at least partly parallel vertical water tube wall panels forming a primarily vertical channel therebetween. The channel preferably has one wall at least partly in common with the combustion chamber, the walls being—for example—tube walls or membrane walls such as typically used in boilers. The channel may form a separator in its upper part, a return duct in its middle part, and a solid bed chamber in its lowermost part. The solid inlet conduit connecting the return duct with the combustion chamber may be prefabricated in the common wall as a frame like construction having several inlet passages. Such a frame structure may also easily be connected to the membrane wall on site. There is no need for complicated large conventional loop seal constructions.

The present invention provides a great improvement especially in pressurized fluidized bed systems, as additional heat transfer surfaces can be located in the return duct at an usually free space in the system. Additionally heat transfer can be controlled by relatively small equipment.

BRIEF DESCRIPTION OF DRAWINGS

The invention will be described further, by way of example, with reference to the accompanying drawings in which.

DETAILED DESCRIPTION OF THE DRAWINGS

Figure 1:
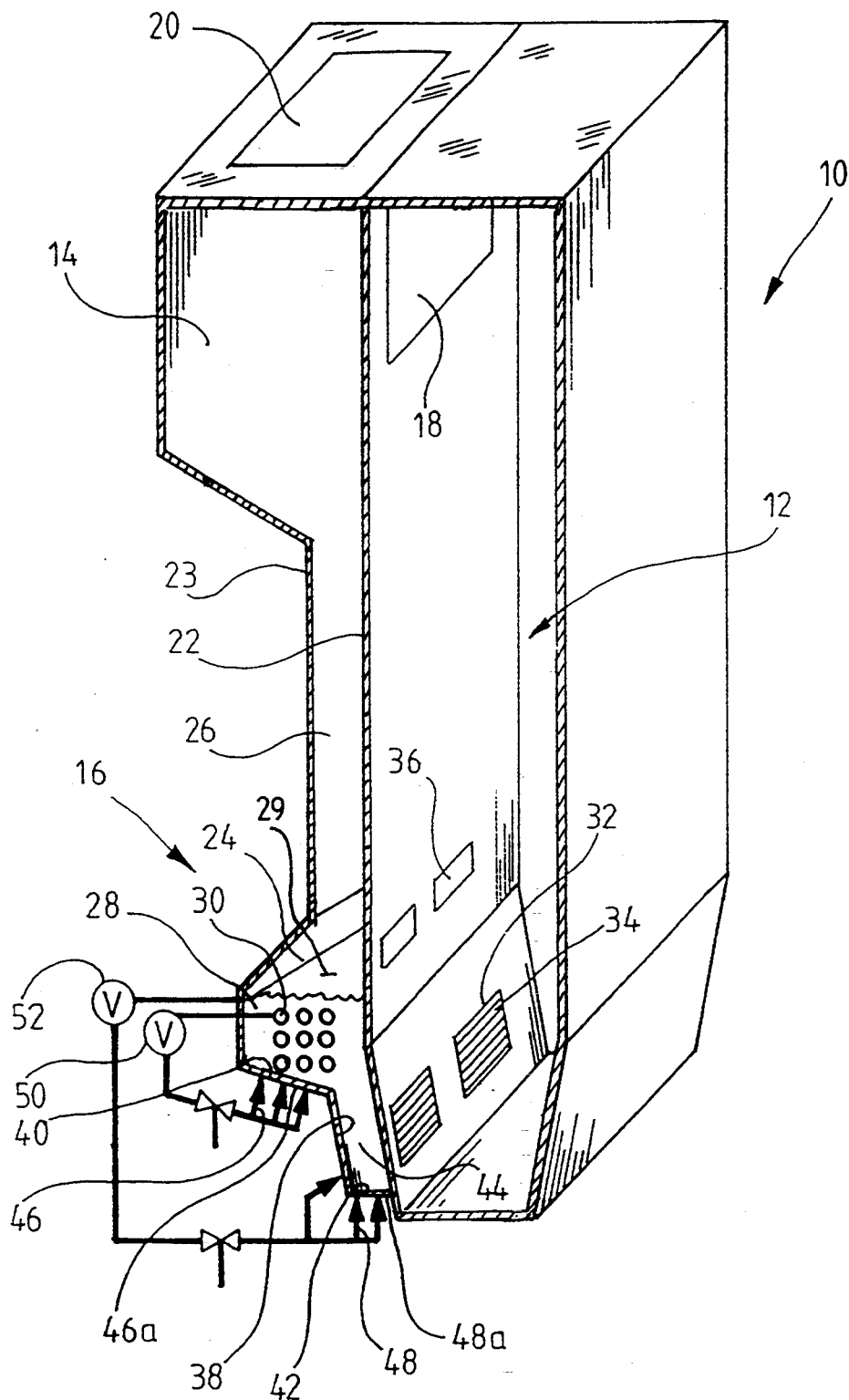
FIG. 1 is a schematic vertical section through a circulating fluidized bed apparatus according to one exemplary embodiment of the invention.

FIG. 1 shows a circulating fluidized bed combustor having a combustion chamber 12 with an expanded fluidized bed of particles therein. A particle separator 14 is connected to the upper part of the combustion chamber 12, for separating particles entrained with the mixture of flue gases and solid material being discharged from the combustion chamber. A return duct 16 is provided for recirculating separated solid material from the separator into the lower part of the combustion chamber. A discharge opening 18 connects the particle separator 14 to the combustion chamber 12. A gas outlet 20 is disposed in the particle separator 14.

The walls of the combustion chamber 12, the separator 14, and the return duct 16, are primarily made of water tube or membrane panels. The panels in the bottom part of the combustion chamber 12 and the return duct 16 may be protected by a conventional refractory lining [not shown in FIG. 1]. A wall 22 forms a common wall between the combustion chamber 12 and the separator 14 and the return duct 16. One single membrane panel may form a second wall 23 in the particle separator and the return duct 16, the wall 23 being substantially parallel to the common wall 22. Beneath the particle separator 14 the second wall 23 is bent towards the common wall 22 in order to form the return duct 16.

In the lower part of the return duct 16 the wall 23 is bent outward to form a solid particle chamber or a heat exchanger chamber 24 therein having a larger horizontal cross section than the upper part 26 of the return duct. A bubbling bed 28 of recycling particles is provided in the heat exchanger chamber 24. Heat transfer surfaces 30 are disposed in the bed 28.

Solid particle inlets 32 are formed in the lower part of the common wall 22 for allowing solid particles to be transported from the heat exchanger chamber 24 into the combustion chamber 12. The solid particle inlets 32 constitute several narrow slot like massages or openings 34 disposed on top of each other.

Gas inlets 36 are formed in the common wall 22 at a level above the surface level of the bed 28, for connecting the gas space of the return duct 16 with the combustion chamber 12.

The bottom 38 of the heat exchanger chamber 24 is staged or formed in two steps an upper portion 40 and a lower portion 42. A lowermost portion 44 of the heat exchanger chamber 24 is disposed adjacent the lowermost part of the combustion chamber 12. The solid particle inlets 32 connect the lowermost portion 44 of the heat exchanger chamber 24 with the lowermost part of the combustion chamber 12.

Fluidizing gas nozzle inlets 46 are disposed at a first level 46a in the upper bottom portion 40 of the return duct bottom 38, for introducing fluidizing gas into the heat exchanger chamber 24, e.g. at a rate of just above 0 to 1 m/s (e.g. about 40 cm/s). Transporting gas nozzles or inlets 48 are disposed at a second level 48a in the lower bottom portion 42 of the return duct bottom 38, for introducing transporting gas for transporting solid particles through solid particle inlets 32 into the combustion chamber 12. The lowermost portion 44 of the bed between the first and second levels 46a and 48a constitutes a solid particle gas seal preventing fluidizing gas from interfering with the transporting of particles through inlets 32 and preventing transporting gas from interference with the fluidization of bed particles in the heat transfer zone.

By controlling the flow of fluidizing gas it is possible to control the heat transfer in the heat exchanger chamber 24 in the return duct 16. The heat transfer may be measured by sensors 50 and used to control the fluidizing gas flow.

By controlling the flow of transporting gas it is possible to control the amount of particles being reintroduced through inlets 32 from the return duct 16 into the combustion chamber 12, and thereby control the total height of the bed 28 and its gas seal effect. The surface level 29 of the bed 28 may be measured with a surface level sensor 52 and used to control the transporting gas flow. The surface level (top surface) 29 may vary within certain limits. When the upper surface 29 of the bed 28 reaches the gas inlet openings 36, particles start to flow over into the combustion chamber 12 and the bed 28 level will normally not further rise. The bed top surface 29 should normally not be allowed to decrease to a level below the heat transfer surfaces 30, as erosion of heat transfer surfaces may become a problem in the gas atmosphere due to strands of particles falling downward at a high velocity. But in some cases especially with small particles in the system there may be an advantage in controlling heat transfer with the height of the bed 28.

The lowermost portion of the heat exchanger chamber 24 may be divided into several sections provided horizontally one after the other along the common wall 22 and each having a solid particle inlet 32 therein. By controlling solid flow through different inlets 32 also solid flow over different sections of the heat transfer section is controlled. Decreased solid flow through an inlet decreases solid flow through corresponding upstream heat transfer section and leads to decreased heat transfer in that particular heat transfer section.

The lowermost portion of the return duct 16 in FIG. 1 constitutes a channel 44 formed adjacent and parallel with wall 22 of the combustion chamber 12. The lowermost portion could be formed as a duct [not shown] extending downwards from any other part of the bottom 40, as long as a barrier bed can may be formed to prevent transporting gas and fluidizing gas from interfering with each other. The downwardly extending duct could be connected to the wall 22 at any suitable location.

Figure 2:
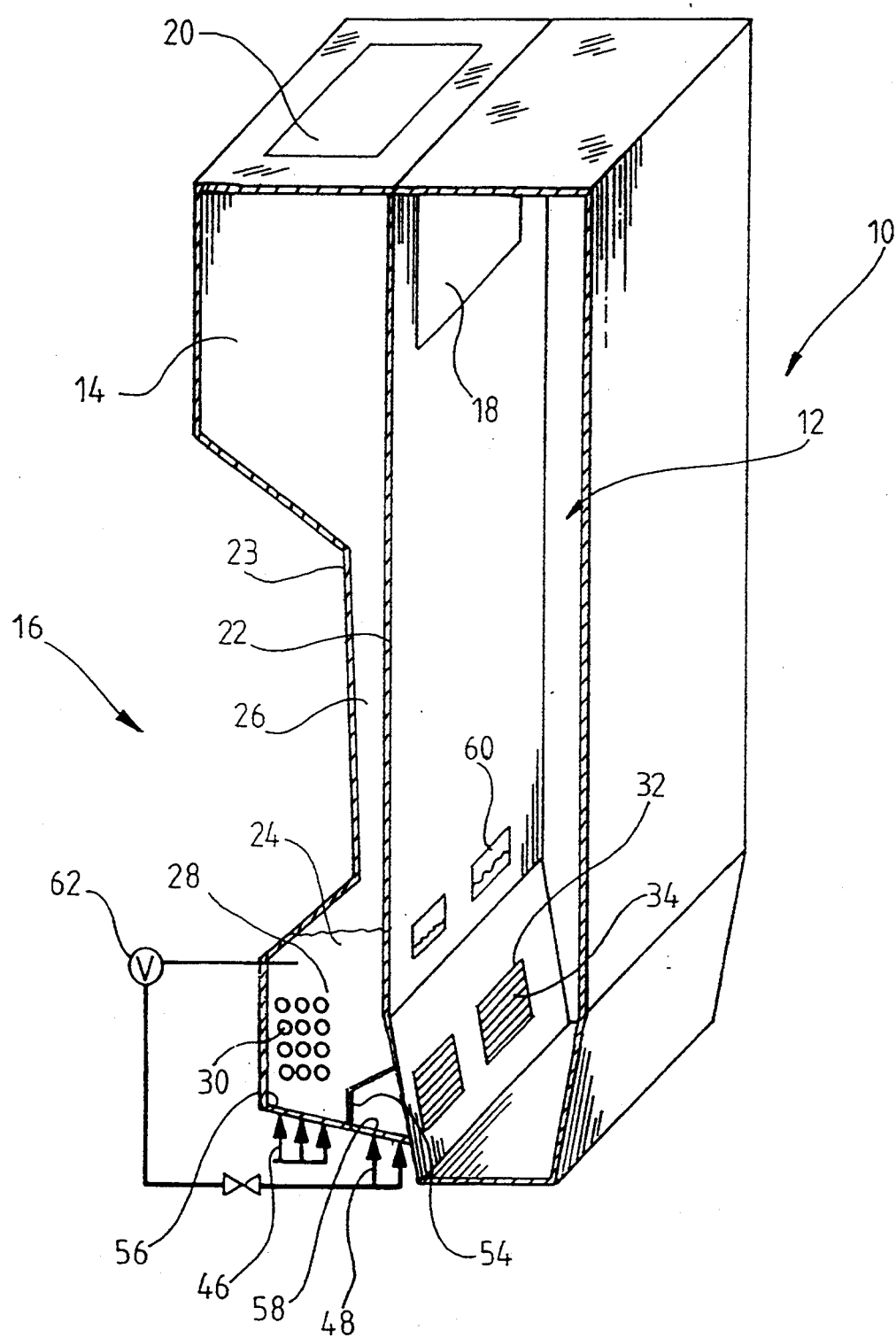
FIGS. 2 and 3 are schematic vertical sections through circulating fluidized bed apparatuses according to other exemplary embodiments of the invention.

FIG. 2 shows another embodiment of a circulating fluidized bed combustor according to the present invention, the combustor having a modified return duct and heat exchanger chamber construction. In FIG. 2 structures comparable to those in the FIG. 1 embodiment are shown by the same reference numerals as in FIG. 1.

The bottom 38 of the heat exchanger chamber 24 in the return duct 16 is inclined and divided by a small partition 54, only reaching a short distance above the bottom, into an upper and lower bottom portion 56 and 58. The height of the partition 54 is preferably less than half the height of the bed 28. Fluidizing gas is introduced into the bed 28 through fluidizing gas inlets 46 disposed in the upper bottom portion 56 and transporting gas inlets 48 are arranged in the lower portion 58 of the bottom 38. The lower portion 58 is disposed adjacent to a lower part of the common wall 22 having the solid particle inlet(s) therein.

The partition 54 is designed to separate a bed of particles on the lower bottom portion from a bed of particles on the upper bottom portion in order to prevent direct access of transporting gas from the inlets 58 to the bed area with heat transfer surfaces 30 and/or fluidizing gas from entering the bed area in vicinity of the solid particle inlets 32. A preferably primarily non-fluidized bed portion 61 of particles is formed above the lower bottom 58 between the partition 54 and the common wall 22. This bed portion 61 forms a gas seal preventing fluidizing and transporting gases from interfering with each other.

The inlets 32 are designed to be able to reintroduce only a portion of the solid particles entering the return duct, into the combustion chamber. The overflow openings 60 at a higher level in the wall 22 than bed surface level 29 are usually desirable.

The heat transfer may be controlled by controlling the flow $V_b$ of solid particles through inlets 32. The temperature in the bed 28 and the thereby heat transfer can be increased by increasing the flow $V_b$ and by correspondingly decreasing the overflow $V_o$ of particles through overflow openings 60.

A temperature measuring sensor 62 may be used to control the transporting gas flow $V_b$.

A gas lock (not shown) is provided in the upper end of the return duct 16, if needed, to prevent fluidizing gas from entering the particle separator.

Figure 3:
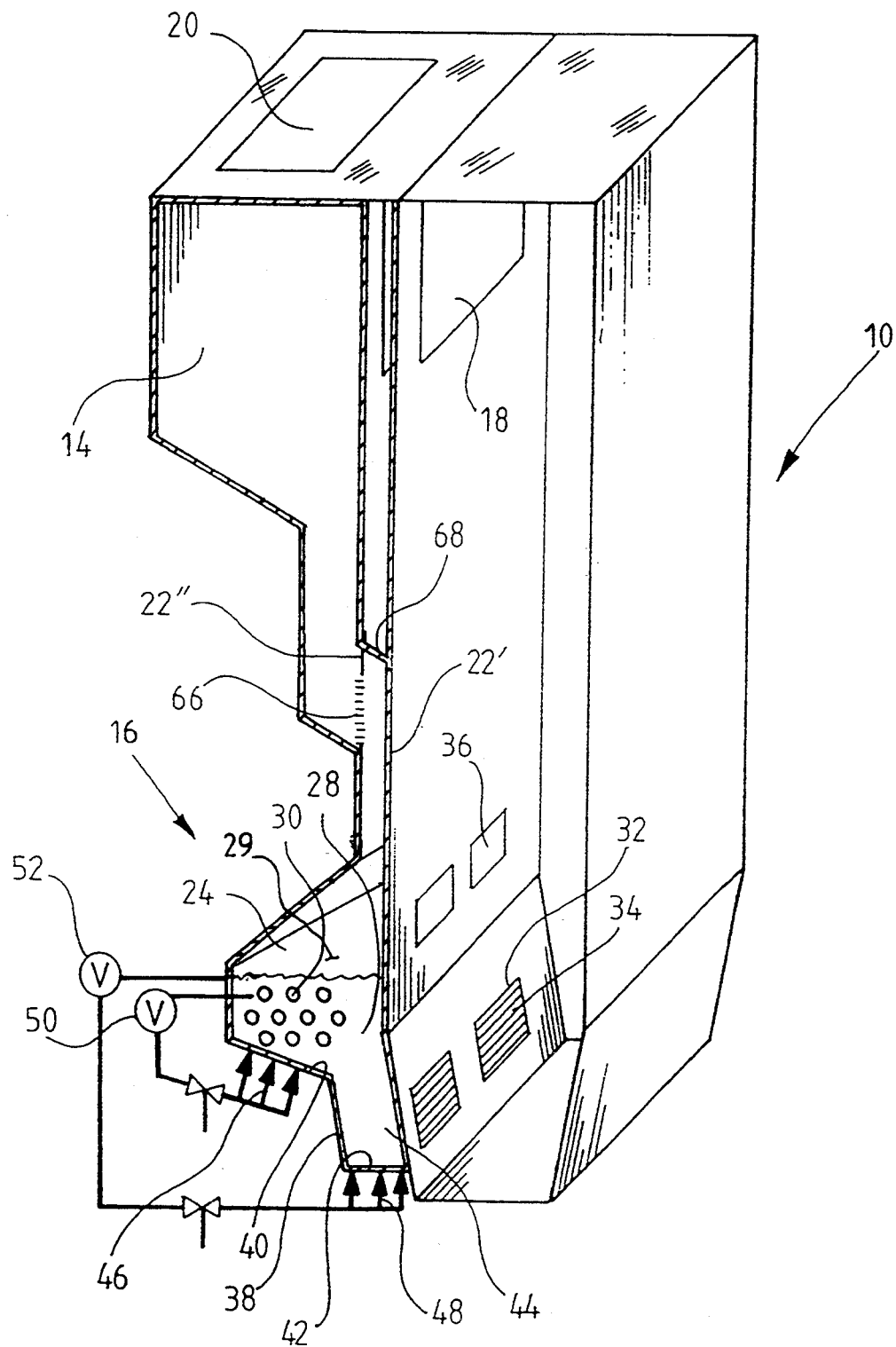

FIG. 3 shows still another embodiment of the present invention. In FIG. 3 the same reference numerals are used as in the FIG. 1 and FIG. 2 embodiments for comparable structures.

FIG. 3 shows a different wall 22 design. The wall connecting the combustion chamber 12 and the separator 14 is of a double wall, including two parallel walls 22' and 22" spaced at a small distance from each other. The first wall 22' is a side wall of the combustion chamber 12, and the second wall 22" is a side wall in the particle separator 14. Thus the combustion chamber 12 and the separator 14 do not have a common wall.

The lower parts of the double walls 22' and 22" are used to form the return duct 16 and the heat exchanger chamber 24. The first wall 22' forms a primarily vertical side wall common with the combustion chamber 12. The second wall 22" is substantially parallel to the first wall 22' in an uppermost part, forming together with the first wall 22' a double wall between the particle separator 14 and the combustion chamber 12.

In the lower part of the combustor first and second walls 22' and 22" form the return duct 16 therebetween. The second wall 22" is in the lower part of the return duct 16 bent outwardly to form the heat exchanger chamber 24. The second wall 22" is further finally bent inwardly at its lowermost part to form the lowermost part 44 of the heat exchange chamber 24. An opening 66 forming a solid flow gas seal is formed in the second wall 22". The opening 66 connects the lower part of the particle separator 14 with the upper part of the return duct 16 and allows recycling particles to enter the return duct 16. An obstacle 68 is disposed between the first and second walls 22' and 22" above the opening 66 to prevent gas or particles from flowing into the space between the two walls 22' and 22".

The heat exchanger chamber 24 in FIG. 3 includes the same elements as the heat exchanger chamber 24 in FIG. 1. Additionally a large particle outlet is disposed in the lowermost part 44 of the heat exchanger chamber.

While the invention has been described in connection with what is presently considered to be most practical and preferred embodiments of the invention, it is to be understood that the invention is not to be limited to the disclosed embodiments, but on the contrary, is intended to cover various modifications and equivalent arrangements included within the spirit and scope of the appended claims. For example, several heat transfer and particle transporting sections could be disposed horizontally one after the other along the wall 22 of the combustion chamber 24. Transporting gas could then be used to transport particles horizontally in a direction parallel with the wall 22 from one section to another. Both heat transfer and transportation of particles can then be individually controlled or even stopped by controlling or stopping gas flow introduced into different sections. In fluidized bed reactors there may be several return ducts some of them being conventional return ducts others having heat transfer sections in their lower parts as discussed previously. Further, it may also be possible to introduce solid particles through openings in the common wall directly from an internal solid circulation inside the combustion chamber into a return duct according to the present invention.

What we claim:

1. A method of operating a circulating fluidized bed system, utilizing a combustion chamber, having a fluidized bed of solid particles therein, a particle separator connected to a discharge opening in the upper part of the combustion chamber, one or more return ducts completely distinct from the combustion chamber connected at upper portions thereof to the particle separator and at lower portions thereof to the combustion chamber through at least one solid particle inlet, transporting gas inlets, and a gas outlet in the particle separator, the method comprising the steps of:

(a) establishing a fast fluidized bed of solid particles in the combustion chamber so that a particle suspension comprising flue gases and solid particles entrained therein is caused to flow upwardly in the combustion chamber, and separating particles from the flue gas in the particle separator;

(b) collecting solid particles separated from the gas and particle suspension;

(c) directing collected solid particles into the one or more return ducts;

(d) establishing a bed of solid particles in the lower part of one of the return ducts, remote from the particle separator, the bed of solid particles having distinct heat transfer and particle transport sections, and the bed having a top surface;

(e) recovering heat from the bed of solid particles in the heat transfer section with heat transfer surfaces disposed therein;

(f) introducing fluidizing gas into the bed of solid particles in the heat transfer section through fluidizing gas inlets, for enabling heat transfer;

(g) introducing transporting gas into the bed of solid particles in the particle transport section through transporting gas inlets, the transporting gas being introduced separately from the fluidizing gas; and (h) transporting solid particles with the transporting gas through the at least one solid particle inlet into the combustion chamber, below the top surface of the bed of solid particles.

2. A method as recited in claim 1 comprising the further step of preventing transporting gas from interfering with heat transfer in the heat transfer section, or preventing fluidizing gas from interfering with transporting of particles through solid particle inlet into the combustion chamber, or both, by disposing a barrier bed of solid particles in the bed of solid particles between the fluidizing gas inlets and the transporting gas inlets.

3. A method as recited in claim 2 wherein said step of preventing transporting gas from interfering with heat transfer in the heat transfer section is practiced by forming the barrier bed primarily of the non-fluidized portion of solid particles in the solid particle bed.

4. A method as recited in claim 1 comprising the further step of preventing fluidizing gas from interfering with the discharging of solid particles through the solid particle inlet by disposing a barrier bed of solid particles in the bed of solid particles between the fluidizing gas inlets and the solid particle inlet.

5. A method as recited in claim 1 wherein the fluidizing gas inlets are disposed on an upper portion of an inclined but substantially planar bottom of the return duct, the transporting gas inlets are arranged on a lower portion of the inclined bottom; and a partition wall is disposed on the inclined bottom between the upper and lower portions thereof; and
wherein step (g) is practiced so that a barrier bed of solid particles is maintained on the lower portion of the inclined bottom, preventing transporting gas from interfering with the heat transfer.

6. A method as recited in claim 1 wherein the fluidizing gas inlets are disposed on an upper portion of an inclined but substantially planar bottom of the return duct, the transporting gas inlets are disposed on a lower portion of the inclined bottom, and a partition wall is disposed on the inclined bottom between the upper and lower portions thereof; and
wherein step (g) is practiced so that a barrier bed of solid particles is maintained on the lower portion of the inclined bottom for preventing the fluidizing gas from interfering with the transporting of solid particles through the at least one solid particle inlet.

7. A method as recited in claim 1 comprising the further step of controlling heat transfer in the heat transfer section by controlling the fluidizing gas being introduced into the heat transfer section.

8. A method as recited in claim 1 comprising the further step of transporting solid particles from the return duct into the combustion chamber by overflow through an overflow inlet disposed above the transporting section.

9. A method as recited in claim 8 comprising the further step of controlling heat transfer in the heat transfer section by controlling the amount of solid particles being transported with transporting gas through the at least one solid particle inlet.

10. A method as recited in claim 1 wherein step (h) is practiced to transport solid particles through several horizontal narrow slot like openings, having a height (h) to length (l) ratio (h/l) <0.5, with transporting gas into the combustion chamber.

11. A method as recited in claim 1 wherein step (f) is practiced to introduce fluidizing gas at a rate of between just above 0 and 1 m/s.

12. A method as recited in claim 1 wherein the heat transfer section and particle transport section are parallel to each other and vertically overlap each other; and wherein steps (f), (g) and (h) are practiced to cause some particles to pass through the return duct from the particle separator to the inlet into the combustion chamber without passing through the heat transfer section.

13. A method as recited in claim 12 comprising the further step of preventing transporting gas from interfering with the heat transfer in the heat transfer section by providing a barrier bed of solid particles in the bed of solid particles between the transporting gas inlets and the heat transfer section.

14. A circulating fluidized bed reactor system comprising:
a combustion chamber, having a fast fluidized bed of particles therein and a discharge opening in an upper part thereof;
a particle separator connected to the discharge opening in the upper part of the combustion chamber;
a gas outlet in the particle separator;
one or several return ducts completely distinct from said combustion chamber and having an upper portion connected to the particle separator and a lower portion connected to the combustion chamber, including at least one return duct having means for collecting solid particles separated from a particle suspension flowing upwardly in the combustion chamber for establishing a bed of solid particles in the lower portion of the return duct, remote from the particle separator the bed of solid particles being divided into a heat transfer section and a particle transport section;
heat transfer surfaces in the heat transfer section for recovering heat from the bed of solid particles;
fluidizing gas inlets for introducing fluidizing gas into the heat transfer section for enabling heat transfer;
at least one solid particle inlet disposed below the top surface of the bed of solid particles, for connecting the lower portion of the return duct with the combustion chamber; and
a plurality of transporting gas inlets for introducing transporting gas into the particle transporting section, for transporting solid particles through the at least one solid particle inlet into the combustion chamber.

15. A circulating fluidized bed reactor system as recited in claim 14 wherein the bottom of the heat transfer section is at a higher level than the bottom of the particle transport section.

16. A circulating fluidized bed reactor system as recited in claim 1 having an inclined but substantially planar bottom and a partition dividing the bottom into an upper and lower portion, the heat transfer section disposed above the upper bottom portion and the particle transport section disposed above the lower bottom portion.

17. A circulating fluidized bed reactor system as recited in claim 14 wherein a barrier bed of solid particles is formed in the bed of solid particles between the fluidizing gas inlets and the transporting gas inlets, for preventing transporting gas from interfering with heat transfer in the heat transfer section, for preventing fluidizing gas from interfering with transporting of particles through solid particle inlet into the combustion chamber, or both.

18. A circulating fluidized bed reactor system as recited in claim 14 further including at least one sensor for sensing the heat transfer, and means for controlling the introduction of fluidizing gas for controlling heat transfer in the heat transfer section in response to said sensor.

19. A circulating fluidized bed reactor system as recited in claim 14 further including at least one overflow inlet above the heat transfer section for introducing particles by overflow into the combustion chamber, and means for controlling the introduction of transporting gas into the particle transporting section for controlling heat transfer.

20. A circulating fluidized bed reactor system as recited in claim 14 wherein said at least one solid particle inlet includes a narrow slot like opening having a height (h) to length (l) ratio (h/l) <0.5.

21. A circulating fluidized bed reactor system as recited in claim 14 further comprising a common wall between the return duct and the combustion chamber and wherein said at least one solid particle inlet has a length of approximatively the width of the common wall.

22. A circulating fluidized bed reactor system as recited in claim 14 further comprising a double wall between the particle separators and the combustion chamber.

23. A circulating fluidized bed reactor system as recited in claim 14 wherein said heat transfer section and said particle transport section are parallel to each other and vertically overlap each other, said particle transport section being located closer to said combustion chamber, so that some particles may pass through said return duct from said particle separator to said solid particle inlet without passing through said heat transfer section.

24. A circulating fluidized bed reactor system as recited in claim 15 wherein the return duct has a staged bottom with at least an upper bottom portion and a lower bottom portion, the heat transfer section being formed on the upper bottom portion and the particle transport section being formed on the lower bottom portion.

25. A circulating fluidized bed reactor system as recited in claim 23 wherein a barrier bed of solid particles containing primarily non-fluidized solid particles is formed in the transport section.

* * * * *